UNITED STATES PATENT OFFICE.

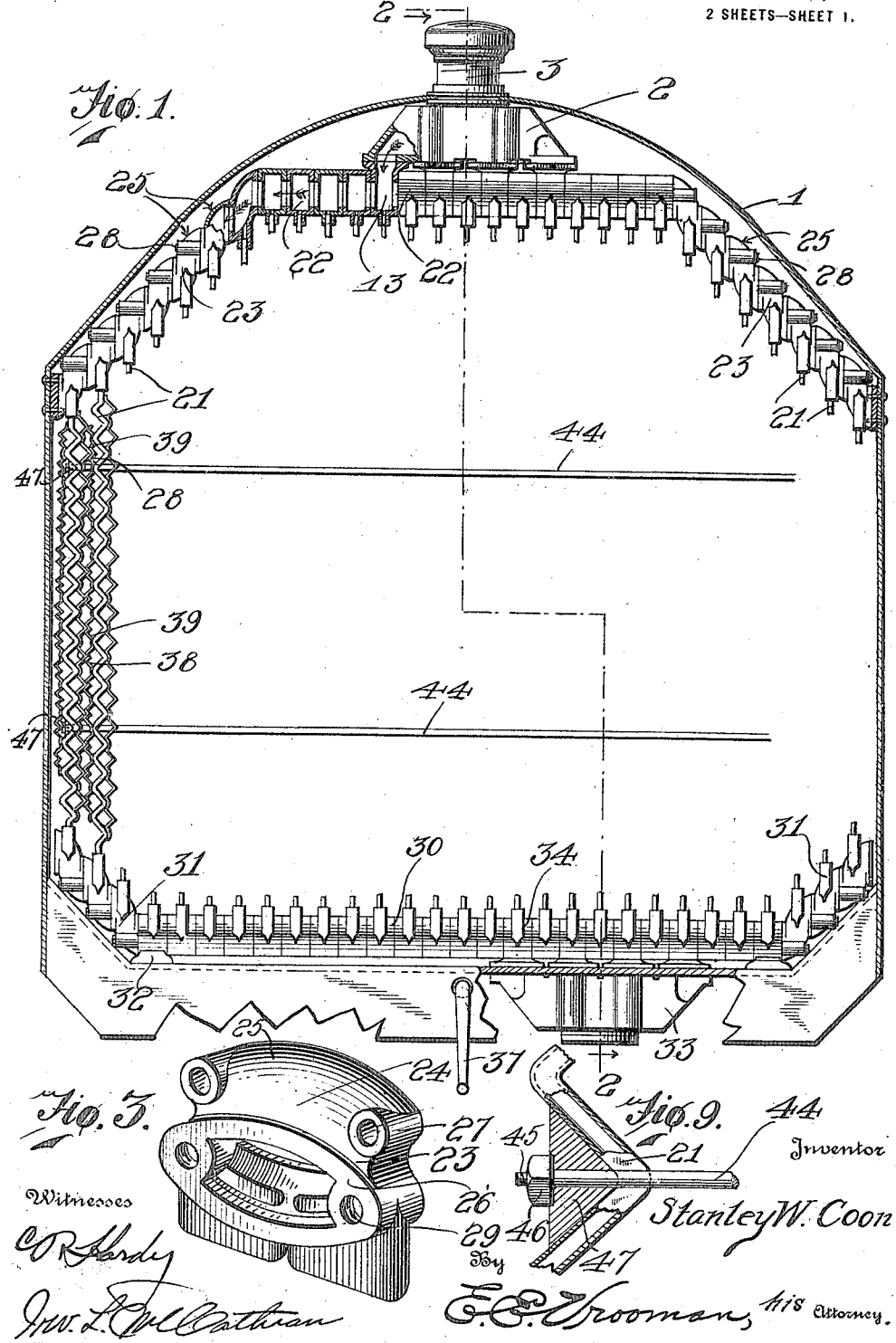

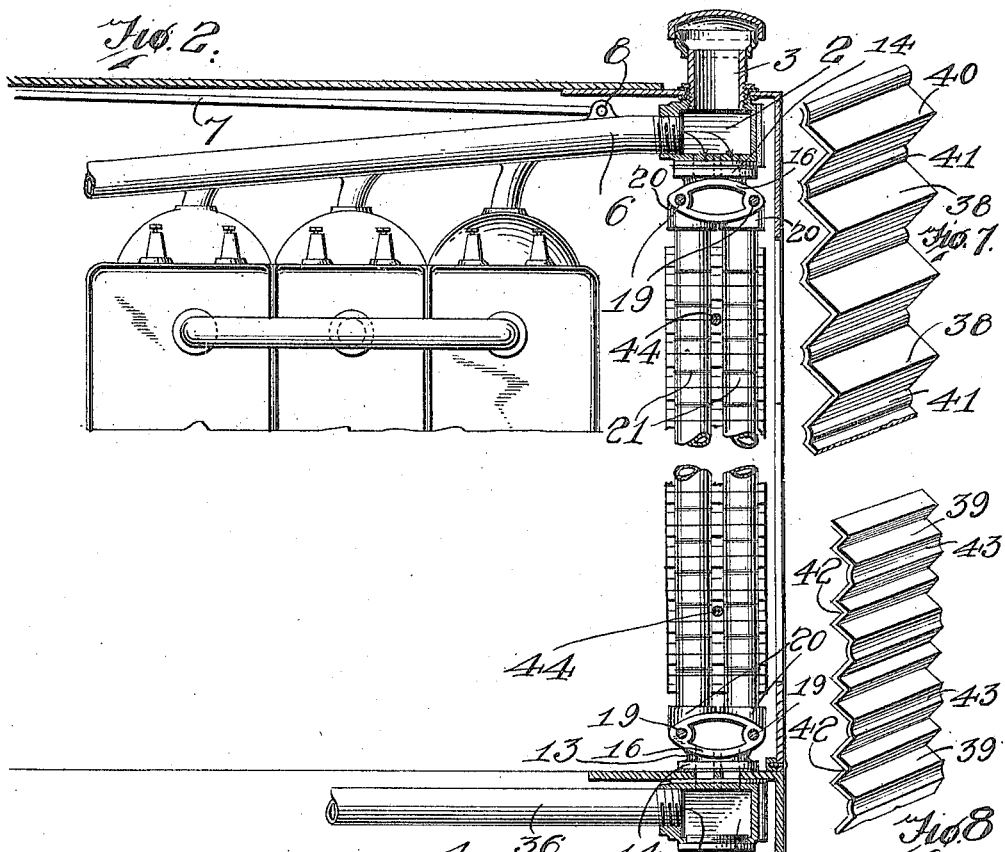

STANLEY W. COON, OF GERMANTOWN, NEW YORK.

AUTOMOBILE-RADIATOR.

1,166,327.  Specification of Letters Patent.  Patented Dec. 28, 1915.

Application filed April 23, 1914. Serial No. 833,952.

*To all whom it may concern:*

Be it known that I, STANLEY W. COON, a citizen of the United States of America, residing at Germantown, in the county of Columbia and State of New York, have invented certain new and useful Improvements in Automobile-Radiators, of which the following is a specification, reference being had therein to the accompanying drawing.

This invention relates to radiators for automobiles and the like and has for its object the production of a simple and efficient means for creating the maximum amount of radiation for cooling water passing through the water jackets for an engine adapted to coöperate therewith.

Another object of this invention is the production of a simple and efficient means for removing the several portions of the radiator, and also for holding the radiating pipes in spaced relation for preventing the vibration of the pipes under the pulsations of the engine used in connection with the present invention.

With these and other objects in view this invention consists of certain novel combinations, constructions, and arrangements of parts as will be hereinafter fully described and claimed.

In the accompanying drawings: Figure 1 is a front elevation of a portion of the radiator, parts thereof being broken away and shown in section for the purpose of facilitating the illustration of the device. Fig. 2 is a section taken on line 2—2, of Fig. 1 looking in the direction of the arrow. Fig. 3 is a detail perspective of one of the radiator sections. Fig. 4 is a detail perspective of still another of the radiator sections used in connection with the entrance and discharge casings to be hereinafter described. Fig. 5 is a top plan view of the entrance casing used in connection with the present invention. Fig. 6 is a section taken on line 6—6, of Fig. 5. Fig. 7 is a perspective view of one of the braces used for holding the radiating pipes in spaced relation. Fig. 8 is a perspective view of the auxiliary portion of one of the braces used for holding the radiating pipes in spaced relation. Fig. 9 is an enlarged vertical section through one of the radiating pipes showing the manner in which one of the transverse rods is connected thereto.

By referring to the drawings it will be seen that the radiator is placed within the usual radiating casing 1 and comprises an entrance casing 2 carried near the top thereof, which casing carries the usual cap 3, which cap is threaded into the upper threaded neck 4 of the casing 2. The casing 2 is provided with an entrance opening 5 into which the supply pipe 6 passes, and this supply pipe 6 is braced by means of a bracing rod 7 which is secured thereto by means of the ear 8, and this bracing rod 7 passes back to the dashboard or other securing place for bracing the pipe 6 near the outer end thereof. The entrance casing 2 is provided with a plurality of joint connecting faces 9, each face having a plurality of securing apertures 10 for the purpose of connecting the casing 2 upon a support of the desired construction, and the faces 9 are provided with a plurality of apertures 11 for the purpose of registering with the apertures 12 formed in the primary radiating sections 13 to insure the thorough circulation of the water through the several radiating sections to be hereinafter described. The primary radiating sections 13 are provided with head portions 14 which fit snugly in engagement with the face portions 9 of the casing 2 and are held in engagement therewith by means of suitable bolts passing through the apertures 15 formed therein. The primary sections 13 of the radiator are provided upon each side thereof with side faces 16, which side faces are provided with enlarged openings 17 to constitute a passage to allow the water to pass therethrough or from one section to another. A plurality of openings 18 are formed in the respective ends of the primary sections 13 to allow the passage of a supporting rod 19 in order to anchor the sections 13 firmly together. Each of the sections 13 is provided with a plurality of spaced depending flat tubular collars 20 which are adapted to be engaged by means of the spaced radiating tubes 21 to be hereinafter fully described. It should be understood that between each of the primary sections 13 is placed an auxiliary circulating section 22 registering with the primary section 13, and these sections 22 are provided with collars 20 similar to the primary sections 13 as illustrated in Fig. 1. A plurality of these auxiliary radiating sections 22 are also connected to the side of the two outer primary sections 13 as is illustrated in Fig. 1. In order that the radiating sections may conform to the contour of the outer casing 1, the corner sections are formed slightly different from the construction as illustrated and described relative to the primary and auxiliary sections indicated by the numerals 13 and 22 respectively. Each corner section 23 is formed in the following manner: The head portion 24 is curved upon one side thereof to produce an inclined face 24, which inclined face terminates in a flat bearing face 26 adapted to connect with the next adjacent section 23. The head 24 is provided upon each side thereof with a collar 27 having an aperture therein for allowing the passage of a connecting bolt 28 in order to anchor the corner sections 23 together. The face 26 is provided with a plurality of threaded apertures 29 to receive the connecting bolts 28 of the next adjacent section. It should be understood that the last corner section may be bolted to the casing 1 in any suitable manner desired.

The lower end of the frame 1 carries a plurality of radiating sections 30 of similar construction to the sections 13 and engages at each end a plurality of corner sections 31 of similar construction to the radiating sections 23. The end radiating sections 30 are supported upon supporting blocks 32 similar to the base 14 of the section 13. An outlet casing 33 is employed upon the bottom of the casing 1 and communicates with a plurality of primary sections 34 similar to the primary sections 13 above mentioned, and this casing 33 is formed of similar construction as that illustrated and described relative to the casing 2, and is provided with an outlet aperture 35 communicating with a return pipe 36 connected to the water jacket of the engine. It should be understood that the casing 23 is placed slightly to the left of the center of the casing 1 so as to be out of the way of the crank shaft or crank 37 illustrated in Fig. 1. The opposite radiating sections of the radiator as illustrated in Fig. 1 are connected by means of spaced radiating pipes 21 as above described, which spaced radiating pipes 21 are preferably formed elliptical in cross-section so as to produce the greatest amount of radiating surface, and these pipes are formed of a substantially corrugated structure producing a wave-like body passing from the upper radiating sections to the lower radiating sections. Between each of the pairs of pipes 2 leading from the respective radiating sections is placed a plurality of bracing members 38 and 39. The primary bracing member 38 constitutes a substantially corrugated body having oppositely extending and alternately pointed ends or edges 40 and grooved ends 41. The grooved ends 41 of the corrugated bracing section 38 are adapted to receive the bent portions of the pipes 21 as is clearly illustrated in Fig. 1 of the drawings. The pointed ends 40 are adapted to fit in the transversely extending substantially V-shaped pockets 42 of the auxiliary bracing member 39, whereas the transversely extending grooves 43 of the auxiliary portion 39 are adapted to receive the bent portion of the next adjacent pipe, thereby constituting an efficient means for holding the pipes 21 in an efficient spaced relation, and also constituting an efficient means for bracing the same to prevent the pipes from vibrating under the pulsation of an engine. An additional means has also been provided for bracing the pipes 21 near the center thereof, which means comprises a plurality of transversely extending rods 44, each rod having a threaded end 45 upon which is threaded an end 46. The respective ends of the rods 44 pass through the substantially V-shaped blocks 47, which blocks fit in the pockets formed by the corrugation of the pipe and constituting an efficient means for bracing the pipes and preventing the same from bulging in the center portion thereof under the weight of the radiating sections supported thereby. It should be understood that the rods 44 pass between the parallel pipes 21 which connect the oppositely respective radiating sections.

From the foregoing description it will be seen that a very simple and efficient means has been produced for efficiently bracing the radiating pipes, and also connecting the several portions of the radiating sections together and thereby greatly adding to the radiating capacity of the radiator adapted to be carried by the front of an automobile or other vehicle.

Having thus described the invention what is claimed as new, is:—

1. A radiator of the class described comprising a plurality of end sections arranged in an upper and lower group, tubes connecting the opposite sections of said upper and lower group, said tubes provided with alternate oppositely extending bowed portions throughout the entire length thereof, a pair of bracing members interposed between each tube, one of said bracing members comprising a substantially corrugated body having oppositely extending and alternately pointed and grooved ends, the other bracing member provided with oppositely extending grooved ends, one set of grooved ends of said last-mentioned bracing member adapted to engage the pointed ends of the first-mentioned bracing member, and the grooved ends of said first-mentioned bracing member and the remaining grooved ends of the second bracing member adapted to engage the adjacent projecting ends of the adjacent tubes for firmly holding the same in spaced relation.

2. A radiator of the class described comprising a plurality of end sections arranged in an upper and lower group, tubes connecting the opposite sections of said upper and lower group, said tubes provided with alternate oppositely extending bowed portions throughout the entire length thereof, a pair of bracing members interposed between each tube, one of said bracing members comprising a substantially corrugated body having oppositely extending and alternately pointed and grooved ends, the other bracing member provided with oppositely extending grooved ends, one set of grooved ends of said last-mentioned bracing member adapted to engage the pointed ends of the first-mentioned bracing member, and the grooved ends of said first-mentioned bracing member and the remaining grooved ends of the second bracing member adapted to engage the adjacent projecting ends of the adjacent tubes for firmly holding the same in spaced relation, and transversely extending rods engaging the end bracing members for firmly holding said bracing members and tubes in a contact relation.

In testimony whereof I hereunto affix my signature in presence of two witnesses.

STANLEY W. COON.

Witnesses:
   RAYMOND T. HAWVER,
   GEORGE H. TATOR.